United States Patent
Joppig et al.

(10) Patent No.: US 7,464,699 B2
(45) Date of Patent: Dec. 16, 2008

(54) CONTROL OF AN ELECTRICALLY HEATED PRE-HEATING DEVICE FOR COLD-STARTING INTERNAL COMBUSTION ENGINES

(75) Inventors: Peter Joppig, Korb (DE); Frank Lantermann, Ingersheim (DE); Friedrich Schmid, Korb (DE); Karl-Heinz Vogel, Backnang (DE)

(73) Assignee: Daimler AG, Stuttgart (DE)

( * ) Notice: Subject to any disclaimer, the term of this patent is extended or adjusted under 35 U.S.C. 154(b) by 374 days.

(21) Appl. No.: 10/564,952

(22) PCT Filed: Jul. 15, 2004

(86) PCT No.: PCT/EP2004/007845

§ 371 (c)(1),
(2), (4) Date: Jul. 11, 2006

(87) PCT Pub. No.: WO2005/012719

PCT Pub. Date: Feb. 10, 2005

(65) Prior Publication Data
US 2007/0062497 A1 Mar. 22, 2007

(30) Foreign Application Priority Data
Jul. 19, 2003 (DE) ................. 103 32 936

(51) Int. Cl.
*F02N 17/04* (2006.01)
(52) U.S. Cl. ............... 123/556; 123/179.21; 123/549
(58) Field of Classification Search ............. 123/556, 123/549, 179.21
See application file for complete search history.

(56) References Cited

U.S. PATENT DOCUMENTS

| 4,685,437 A | * | 8/1987 | Tanaka et al. ............... 123/549 |
| 5,138,987 A | | 8/1992 | Schmid et al. |
| 5,894,832 A | | 4/1999 | Nogi et al. |

(Continued)

FOREIGN PATENT DOCUMENTS

DE      198 54 077 A1      5/2000

(Continued)

OTHER PUBLICATIONS

International Search Report.

(Continued)

*Primary Examiner*—M. McMahon
(74) *Attorney, Agent, or Firm*—Crowell & Moring LLP

(57) ABSTRACT

In a method for heating up the intake air of an internal combustion engine during the preglow phase or start-up phase, the heating power is controlled by a control unit of the engine electronics as a function of the operating data of the internal combustion engine. During the preglow phase, the heating element is initially supplied with full current until the heating element reaches its reference temperature. After the reference temperature has been reached and until the start-up phase, a post-heating phase begins in which the heating element is kept at a constant temperature by way of a relatively low power. During the start-up phase, in a first time period, the heating element is switched off, and in a second time period in which the speed of the internal combustion engine is raised to the starting speed, the heating element is switched on again.

15 Claims, 2 Drawing Sheets

U.S. PATENT DOCUMENTS

Figure 1:
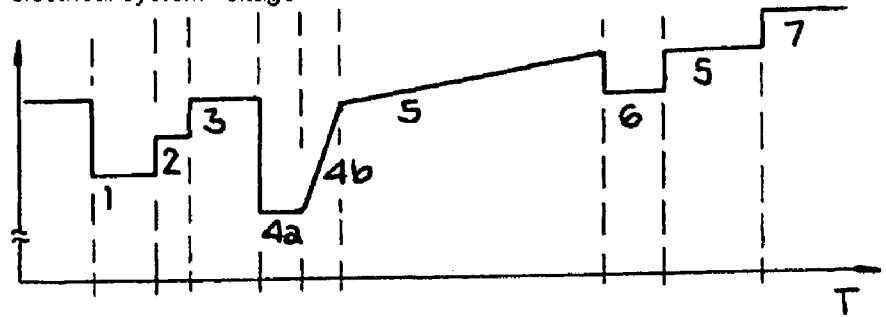
Figure 1:
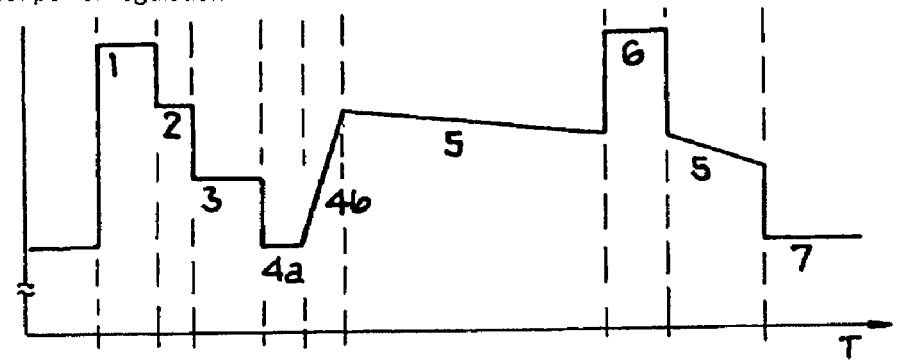
Figure 1:
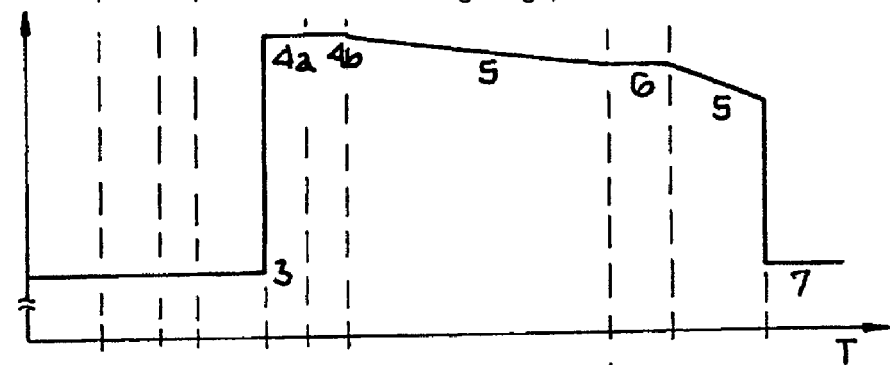
Figure 1:
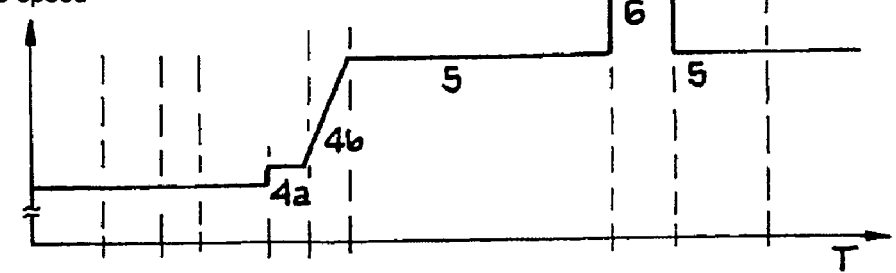
Figure 1:
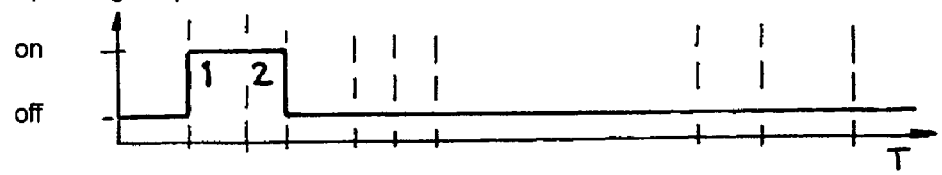

| | | | |
|---|---|---|---|
| 6,138,645 A | 10/2000 | Joppig et al. | |
| 6,354,256 B1 * | 3/2002 | Ohanian et al. | 123/179.21 |
| 6,415,774 B1 * | 7/2002 | Wang et al. | 123/556 |
| 6,964,269 B2 * | 11/2005 | Gschwind et al. | 123/549 |

FOREIGN PATENT DOCUMENTS

| | | |
|---|---|---|
| DE | 100 26 339 A1 | 12/2001 |
| EP | 1 136 695 A1 | 9/2001 |

OTHER PUBLICATIONS

English language Abstract of Japanese publication 61157749, published Jul. 17, 1986.

English language Abstract of Japanese publication 08232766, published Sep. 10, 1996.

\* cited by examiner

CONTROL OF AN ELECTRICALLY HEATED PRE-HEATING DEVICE FOR COLD-STARTING INTERNAL COMBUSTION ENGINES

BACKGROUND AND SUMMARY OF THE INVENTION

This invention relates to a method for heating up the intake air, in particular for an internal combustion engine in the start-up or warm-up-phase.

Heating up the intake air in internal combustion engines, in particular in diesel engines in the start-up and warm-up phases, is necessary for several reasons. At low ambient air temperatures and consequently at low intake air temperatures, an insufficient post-compression temperature and hence an increasing ignition delay occur, in diesel engines in particular, so that the period between the fuel entering the combustion space and igniting becomes too long. In addition, local over-enrichment, incomplete combustion and high pressure gradients occur at low intake temperatures as a result of sudden mixture conversion in the cylinder. The results are greatly increased hydrocarbon emissions in the exhaust gas, knocking of the diesel engine and the disadvantages resulting from this such as severe environmental pollution and increased loading of the powertrain parts.

A heating flange for pre-heating air in an intake line which leads to a diesel internal combustion engine is known from the general prior art according to German patent application DE 100 26 339 A1. It is also known from this document to actuate the heating element in the heating flange by means of a control unit. The controller in this case leaves the current in the heating unit at a constant value and the heating power introduced is determined solely by the switching-on time of the heating element. When the diesel engine is started, the heating flange or the heating element is switched off for a short period in order to make sufficient energy available for the starter from the vehicle electrical system.

A generic method from which the invention proceeds is known from German patent application DE 198 54 077 A1. It is known, from the disclosure provided by this document, to assist the cold start of a diesel engine by means of an air pre-heater, the air being preheated by means of a preglow period and an afterglow period. The preglow period and the afterglow period are interrupted by the start process in which the diesel engine ramps up to starting speed after the starter is activated. During the start process, no energy is supplied to the heating flange. The heating flange is actuated by the engine electronics. Before starting, the preglow period and afterglow period are calculated in the engine electronics from the ambient data. The air temperature and the coolant temperature before the cold start are taken into account here. The preglow period and afterglow period are controlled here only in terms of time, that is to say there is no open-loop or closed-loop control of the current for the operation of the heating element in the intake pipe of the diesel engine.

Today, modern direct injection diesel engines predominantly have electronically controlled injection systems. Cold starting of electronically controlled diesel engines is possible without difficulty down to ambient air temperatures of −15° C. An additional measure, such as heating the intake air by means of a start assist device, is not necessary down to these temperatures. There are however numerous applications where even a modern diesel engine requires a cold start device, such as:

at temperatures below −15° C.,
at temperatures below 0° C. with fuels with a low cetane number,
in applications at altitudes over 1500 m above sea level and below 0° C.,
in applications with base load (hydraulic appliances, fixedly coupled drives) below 0° C.,
in special-purpose vehicles such as mobile cranes, compressors, piste-grooming units, or construction machinery in a temperature range below 0° C.

The combination of diesel engines with a hydraulic drive in piste-grooming units provides particularly extreme demands on the cold start capabilities of diesel engines. Since manufacturers of these units use increasingly high-powered direct injection diesel engines with a small swept volume which only deploy their full power at full charge air pressure, problems occur when cold starting in regions at relatively high altitude, since no charge air pressure is initially present. If such an engine is started at an altitude of for example 3000 m above sea level and at −15° C., pre-heating devices known today are not sufficient unless the engine is brought up to operating temperature by the coolant temperature by means of a complex auxiliary heating system. For reasons of cost, complete pre-heating, which also includes the drive unit, is only used in arctic applications.

Proceeding from the abovementioned prior art, it is the object of the invention to improve the effect of existing cold start devices by means of improved actuation.

This object is achieved by a method having the claimed features. Further advantageous embodiments of the invention are defined in dependent claims and apparent from the description of the figures.

The invention succeeds primarily by means of variable power adaptation of the heating flange to the prevailing ambient conditions. The preglow phase is divided here into three phases, namely into one phase at full current, one post-heating phase and one start-readiness phase. In the post-heating phase, the heating elements of the heating flange are operated in such a way that the heating flange is kept at a reference temperature. In the post-heating phase, a heat cushion is produced for the start process. After the two first preglow phases, the glow monitoring lamp goes out and, by going out, signals readiness to start. The start-readiness phase then follows. In order to prevent the heating elements from cooling during the start-readiness phase, the heating elements are operated at a further reduced power during the start-readiness phase. If the engine has not been started after a predetermined start-readiness period has expired, the heating elements are switched off.

During the start process, heating of the heating flange is interrupted for a short period but only until the first ignitions assist the running up of the engine to idling speed. As soon as the first ignitions begin, the starter is relieved of load and the vehicle electrical system energy which is available as a result of the relieving of load on the starter is used again to heat the heating elements of the heating flange. By means of the advanced post-heating phase, the temperature of the intake air is prevented from cooling down in the event of the engine turning for a long period.

The following advantages are achieved by means of the invention.

The power-controlled preglow period is only one third of the length of the preglow period of conventional cold start methods.

The afterglow is carried out according to the invention in a power-controlled manner as a function of the coolant temperature and the charge air temperature, the engine speed and the air mass. As a result, at an increased engine speed and an increased air flow rate in the afterglow phase, the electrical heating power can be adapted to the air flow rate so that the charge air temperature does not fall and the true running does not deteriorate even when the engine is cold. The diesel engine can be subjected to load earlier as a result of the adjustment of the heating power during the afterglow period.

It was possible to considerably shorten the interruption of the heating power during the start process. The interruption of the heating power during the start process is now variably adjustable as the interruption is made dependent on the current engine speed. As a result, it is possible to extend the afterglow phase further into the start-up phase as heating begins again when the first ignitions are indicated by an increase in the engine speed. The extent of post-heating is dependent here on the vehicle electrical system voltage. This advanced afterglow period gives better running up assistance to the diesel engine in reaching its idling speed and prevents the charge air temperature from falling in the event of a relatively long turnover period with the starter.

The engine control unit is preferably used to actuate the heating flange. Information about the engine state (engine stationary, engine running, starter on, starter off), the engine speed, the coolant temperature, the charge air temperature, the charge air pressure, the calculated air mass and the vehicle electrical system voltage can constantly be called by means of the engine electronics. By means of correction methods implemented in the engine electronics, the rising or falling charge pressure which has different effects at different altitudes can therefore also be taken into account in the cold start method according to the invention. The electrical power can also be corrected at high altitudes so that the engine can utilize to an optimum degree the low oxygen content which is present there. After the heating bands have initially been supplied with full current during the preglow period and after a reference temperature has been reached, the heating bands of the heating flange are kept at a constant operating temperature by means of reduced heating power. This conserves the battery and protects the heating bands from overloading.

The cold start method according to the invention is suitable for engines having a swept volume of up to 16 liters per heating flange. In corresponding applications of control algorithms in engine electronics, the cold start method according to the invention can also be used for engines which operate with special fuels. These are, for example, engines which operate with kerosene, biodiesel, etc.

The invention will be described in more detail with reference to the drawing figures.

BRIEF DESCRIPTION OF THE DRAWING FIGURES

Figure 2:
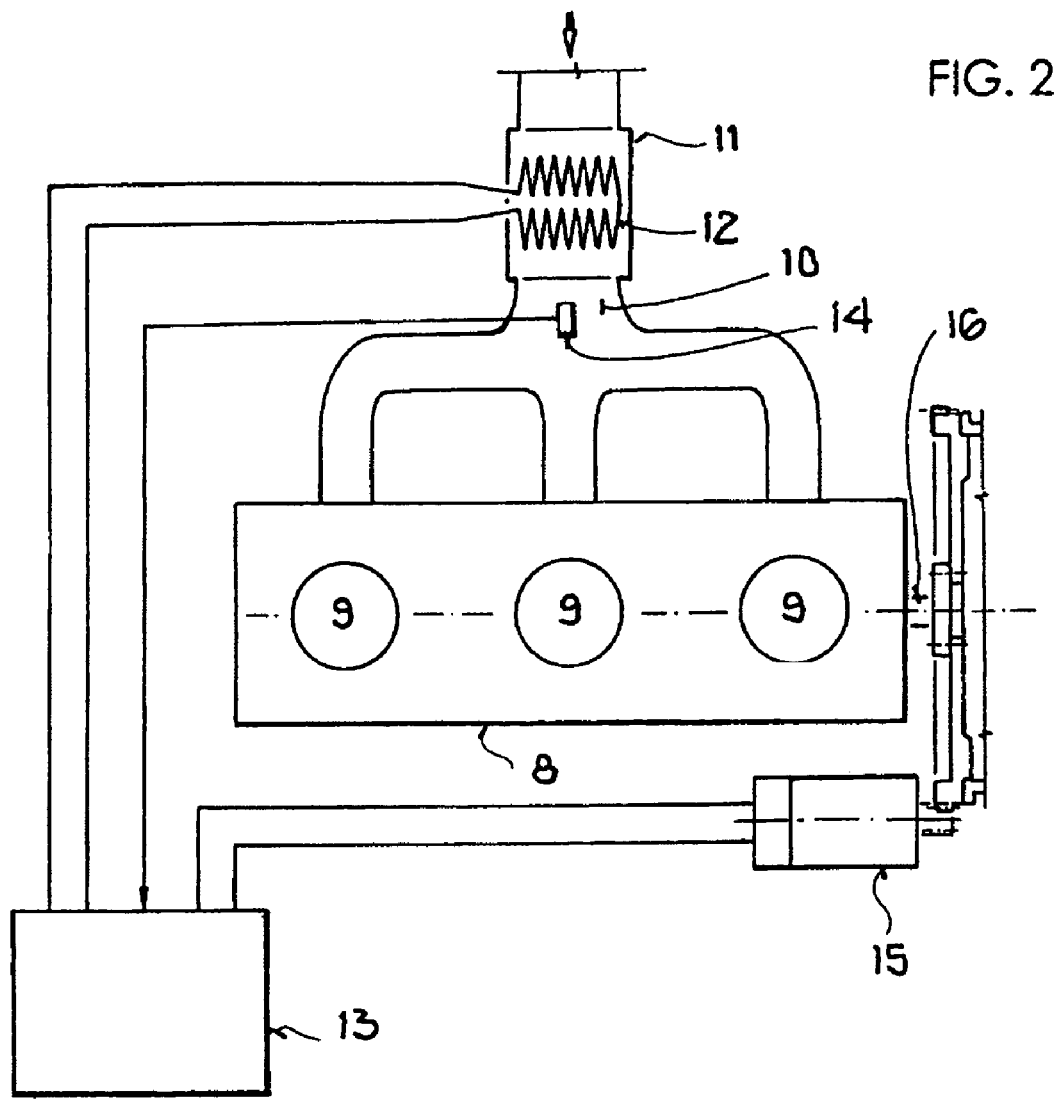

FIG. 1 shows a basic profile of the vehicle electrical system voltage, the electrical power regulation, the charge air temperature, the engine speed and the actuation of the operating lamp as occurs in the cold start method according to the invention, and FIG. 2 shows an internal combustion engine on which the cold start method of the invention can be used.

DETAILED DESCRIPTION OF THE INVENTION

During the preglow phase 1, 2, 3 between switching on the ignition and activation of the starter, the current supplied to the heating elements in the heating flange is variably controlled. During a first time period 1, the heating element is initially supplied with full current until the heating flange reaches a reference temperature. After the reference temperature has been reached, a post-heating phase 2 and a start-readiness phase 3 begin in which the heating power is controlled in such a way that the heating flange is kept at a constant temperature. The profile of the vehicle electrical system voltage shows a sharp drop during the supply of full current 1 but recovers markedly during the post-heating phase 2 and the start-readiness phase 3. During the preglow phase, no charge air is yet taken in and the engine is not yet turning. The start-up phase begins when the starter of the internal combustion engine is activated. In a first time period 4a of the start-up phase, the speed of the internal combustion engine is determined exclusively by the speed of the starter. During this first phase of the start process, the engine speed therefore remains at the constant level of the speed effected by the starter. During this operating state, the heating power is interrupted such that as much energy is available as possible for the starter from the vehicle electrical system. The intake charge air is heated by the heated heating flange. A heat cushion was produced in the intake pipe of the internal combustion engine in the post-heating phase 2 so that in spite of the heating power being switched off, the intake charge air can be heated over a time period corresponding to the heat reservoir generated. As soon as the first ignitions of the internal combustion engine begin, these first ignitions assist the running up of the engine. In this second time period 4b of the start-up phase, the starter is progressively relieved of loading as the effectiveness of the ignitions which are beginning increases. The now relatively low current consumption of the starter brings about an increase in the vehicle electrical system voltage. This energy which is now available to the vehicle electrical system again can be used during the second time period 4b for the heating of the heating flange which is now recommencing. As a result, the running up of the internal combustion engine can be assisted during the second time period 4b from the first commencement of ignitions up to its idling speed as the intake charge air can be kept at as constant a temperature as possible even in the event of a relatively long turnover period of the starter by means of the heating of the heating flange which is recommencing.

The afterglow phase 5 begins after the idling speed is reached. In this phase, the internal combustion engine runs under its own power and heats up rapidly. As the heating of the coolant of the internal combustion engine increases, the heating power of the heating flange can be reduced progressively more in this afterglow phase. As a result, the vehicle electrical system voltage increases gradually. Should power be demanded of the internal combustion engine in this afterglow phase before the engine has reached the intended operating temperature, the intake charge air can thus, by means of the method according to the invention, be kept at a constant temperature by means of intensified additional heating during an increase in speed 6 of the internal combustion engine. The cold running phase ends as soon as the internal combustion engine or the coolant in the internal combustion engine has reached an intended operating temperature. The heating flange is then switched off.

FIG. 2 shows a basic illustration of a typical internal combustion engine as is known per se. The cold start method according to the invention can be used on an internal combustion engine of this type. An internal combustion engine, in particular a diesel engine 8 having, for example, three combustion cylinders 9, takes in its air by means of an intake pipe 10. A heating flange 11 having heating elements 12 which project into the intake pipe 10 is arranged in the intake pipe 10. The power control and the supply of current to the heating elements is undertaken by a control unit, in particular an engine control unit, 13. In order to regulate the temperature level of the intake charge air, the control unit 13 receives input from a temperature sensor 14 which measures the air temperature in the intake pipe downstream of the heating elements but before entry into the combustion cylinders. The starting process is initiated by the control unit 13 by activating a starter 15. The pinion of the starter 15 engages here in a gear wheel in a non-positive manner and in a manner known per se. The gear wheel is in turn connected in a non-positive manner to the crankshaft 16 of the internal combustion engine and turns the crankshaft when the starter is activated. The cold start method according to the invention can advantageously be used on an internal combustion engine of this type.

The invention claimed is:

1. A method for heating up the intake air of an internal combustion engine during a preglow phase or a start-up phase with at least one electrically heatable heating element in an intake line of the internal combustion engine, heating power being controlled by a control unit as a function of operating data of the internal combustion engine, comprising:
supplying the heating element with full current during the preglow phase until the heating element reaches its reference temperature,
beginning a post-heating phase, in which the heating element is kept at a constant temperature by a relatively low power, after the reference temperature has been reached and until the start-up phase,
switching the heating element off in a first time period during the start-up phase, and
switching the heating element on again in a second time period during the start-up phase in which the speed of the internal combustion engine is raised to the starting speed.

2. The method as claimed in claim 1, wherein a start-readiness phase, in which the heating element is operated at a further reduced power, follows the post-heating phase.

3. The method as claimed in claim 1, wherein, in a subsequent afterglow phase, an afterglow at a reduced heating power is carried out after the idling speed has been reached and until an applicable engine temperature is raised.

4. The method as claimed in claim 3, wherein, in the afterglow phase, the charge air temperature is kept constant by way of the heating element during an increase in speed.

5. The method as claimed in claim 3, wherein an afterglow period is determined at the beginning of the start process as a function of the coolant temperature or the charge air temperature.

6. The method as claimed in claim 1, wherein the heating element is switched off in a timed or temperature-controlled manner.

7. The method as claimed in claim 2, wherein, in a subsequent afterglow phase, an afterglow at a reduced heating power is carried out after the idling speed has been reached and until an applicable engine temperature is raised.

8. The method as claimed in claim 7, wherein, in the afterglow phase, the charge air temperature is kept constant by way of the heating element during an increase in speed.

9. The method as claimed in claim 7, wherein an afterglow period is determined at the beginning of the start process as a function of the coolant temperature or the charge air temperature.

10. The method as claimed in claim 2, wherein the heating element is switched off in a timed or temperature-controlled manner.

11. The method as claimed in claim 3, wherein the heating element is switched off in a timed or temperature-controlled manner.

12. The method as claimed in claim 4, wherein the heating element is switched off in a timed or temperature-controlled manner.

13. The method as claimed in claim 5, wherein the heating element is switched off in a timed or temperature-controlled manner.

14. The method as claimed in claim 2, wherein an afterglow period is determined at the beginning of the start process as a function of the coolant temperature or the charge air temperature.

15. The method as claimed in claim 4, wherein an afterglow period is determined at the beginning of the start process as a function of the coolant temperature or the charge air temperature.

* * * * *